J. G. KLOCK.

Peg Cutters.

No. 124,826.

Patented March 19, 1872.

Witnesses:
G. Waithrp.
Solon C. Kemon

Inventor:
Jacob G. Klock
PER Munn & Co
Attorneys.

No. 124,826

UNITED STATES PATENT OFFICE.

JACOB G. KLOCK, OF MANSFIELD, OHIO.

IMPROVEMENT IN PEG-CUTTERS.

Specification forming part of Letters Patent No. 124,826, dated March 19, 1872.

Specification describing an Improved Peg-Cutter for Boots and Shoes, invented by JACOB G. KLOCK, of Mansfield, in the county of Richland and State of Ohio.

The invention will first be fully described, and then clearly pointed out in the claim.

Figure 1:
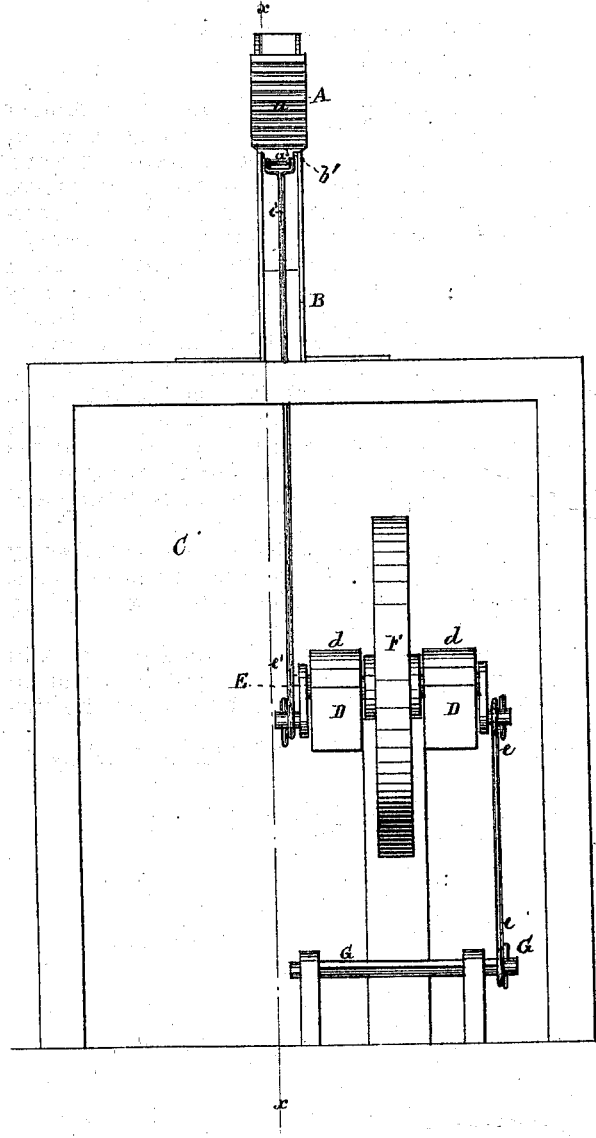
Figure 2:
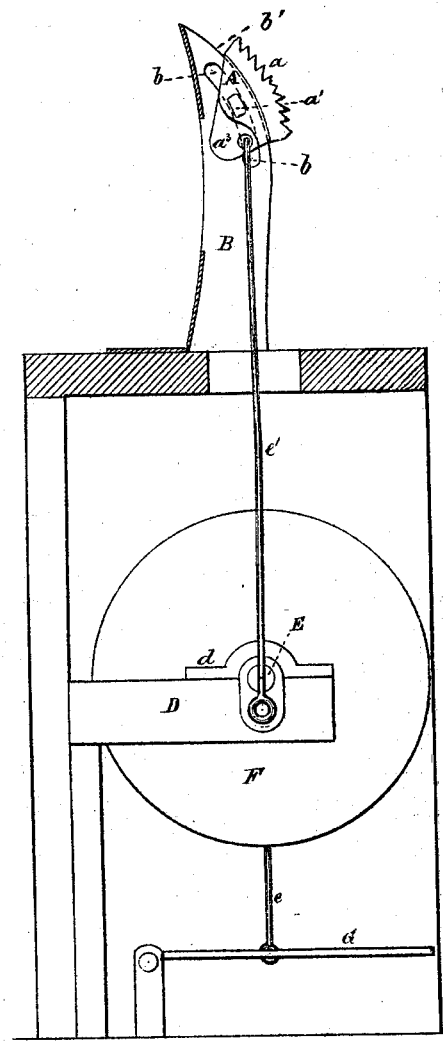

Figure 1 is a front elevation of peg-cutter, and the treadle mechanism by which it is operated. Fig. 2 is a vertical and sectional elevation through line $x\ x$, Fig. 1.

A is the peg-cutter, having ratcheted working face $a$, which is curved in the arc of a circle corresponding to the ordinary curve on the inner side of boot-sole. $a^1\ a^1$ are side studs; and $a^3$, the shank of cutter. B is a hollow upright, arc-slotted at $b\ b$, on the sides, and having the correspondingly-curved guides $b'\ b'$, by which the float is enabled to move in the arc desired. C is a box, which supports the upright, and incloses mechanism for operating it. D is a projecting and bifurcated bracket, provided with bearings $d\ d$ for shaft E of balance-wheel F. This shaft E is provided with a crank-arm at each end, to which are attached crank-pitmen $e\ e'$. The pitman $e$ connects with treadle G, while the pitman $e'$ connects with shank $a^3$ of cutter A.

The mode of operation is as follows: The boot is placed over hollow upright B so as to bring the inner face of boot-sole in contact with cutter A. The treadle is then operated, and the cutter thereby reciprocated in the arc-slots $b\ b$ of upright, whereby the former moves evenly over the curved inner surface of boot-sole, doing its work uniformly and perfectly.

I am aware that floats or peg-cutters are in public use which operate horizontally both by a reciprocating and a rotary movement. These, however, always destroy or injure the crimp of the boot to a greater or less extent, and do not perform their work uniformly so as to leave a smooth surface on inner side of sole, while, on the other hand, mine does not impair the crimp of the boot, but adapts itself to the shape thereof, and cuts the pegs cleanly and neatly.

Having thus described all that is necessary to a full understanding of my invention, what I esteem as new, and desire to secure by Letters Patent, is—

The arc-shaped float A, arranged to work in the arc-slot of the hollow upright B and on the curved sides thereof, as and for the purpose set forth.

JACOB G. KLOCK.

Witnesses:
G. W. KLOCK,
E. A. HAWORTH.